US007197509B2

(12) United States Patent
Foster et al.

(10) Patent No.: US 7,197,509 B2
(45) Date of Patent: Mar. 27, 2007

(54) METHOD, SYSTEM, AND COMPUTER PROGRAM PRODUCT FOR MANAGING PERSISTENT DATA ACROSS DIFFERENT RELEASES

(75) Inventors: Robert Kimberlin Foster, Austin, TX (US); Casey Lee McCreary, Liberty Hill, TX (US); Charles Andrew McLaughlin, Round Rock, TX (US); Christine I. Wang, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 524 days.

(21) Appl. No.: 10/631,054

(22) Filed: Jul. 31, 2003

(65) Prior Publication Data

US 2005/0027668 A1 Feb. 3, 2005

(51) Int. Cl.
*G06F 17/30* (2006.01)
(52) U.S. Cl. .................................................... 707/102
(58) Field of Classification Search ............. 707/1–10, 707/100–104.1, 200–206; 726/22
See application file for complete search history.

(56) References Cited

U.S. PATENT DOCUMENTS

| | | | |
|---|---|---|---|
| 5,864,875 A | 1/1999 | Van Huben et al. ........ 707/200 |
| 6,073,139 A * | 6/2000 | Jain et al. .................... 707/203 |
| 6,175,855 B1 | 1/2001 | Reich et al. ................. 709/202 |
| 6,205,445 B1 | 3/2001 | Tokuyama ................... 707/10 |
| 6,336,217 B1 | 1/2002 | D'Anjou et al. .............. 717/11 |
| 6,385,768 B1 | 5/2002 | Ziebell ......................... 717/121 |
| 6,415,435 B1 | 7/2002 | McIntyre ..................... 717/108 |
| 6,430,455 B1 | 8/2002 | Rebello et al. ............. 700/105 |
| 6,519,767 B1 | 2/2003 | Carter et al. ................. 717/140 |
| 6,725,219 B2* | 4/2004 | Nelson et al. ................ 707/10 |
| 2002/0100017 A1 | 7/2002 | Grier et al. .................. 717/120 |
| 2002/0133804 A1 | 9/2002 | Sheedy ........................ 717/106 |
| 2002/0174085 A1* | 11/2002 | Nelson et al. .................. 707/1 |
| 2003/0041304 A1 | 2/2003 | Numata et al. ............. 715/513 |
| 2003/0097365 A1 | 5/2003 | Stickler ....................... 707/100 |
| 2006/0021033 A1* | 1/2006 | Huynh et al. ................. 726/22 |

OTHER PUBLICATIONS

IBM Research Disclosure, "EC XML Parser for Parsing XML into Java Hashtable", Aug. 2000, pp. 1477-1478.
IBM Research Disclosure, "System and Method for Java Serialization Compatibility Using XML", Mar. 2002, pp. 5167-5168.
"Online Catalog, Applying RCS and SCCS", www.oreilly.com/catalog/rcs/toc.html, pp. 1-4.

* cited by examiner

*Primary Examiner*—Diane Mizrahi
(74) *Attorney, Agent, or Firm*—Duke W. Yee; Diana R. Gerhardt; Theodore D. Fay, III

(57) ABSTRACT

A method, system, and computer program product are disclosed for managing an application's persistent data across multiple different release versions of the application. A format for a memory area is defined wherein the persistent data will be stored according to a first release version of the application. The format is organized to permit the application running at different release versions to access the memory area. The memory area is accessed using the application that is running at a second release version. The memory area is divided into individually accessible sections. The format includes a template file for each section for each release version.

26 Claims, 6 Drawing Sheets

METHOD, SYSTEM, AND COMPUTER PROGRAM PRODUCT FOR MANAGING PERSISTENT DATA ACROSS DIFFERENT RELEASES

BACKGROUND OF THE INVENTION

1. Technical Field

The present invention relates generally to the field of data processing systems and more specifically to a method, system, and computer program product for managing persistent data across different releases.

2. Description of Related Art

A hardware management console (HMC) is a tool that is designed to help manage a data processing system, and in particular the central electronics complex (CEC). The management functions of the HMC include simple tasks such as powering the CEC on and off. The HMC also performs more complicated tasks that involve creating logical partitions (LPARs) in the CEC, and configuring profiles used in the activation of those LPARs to indicate which hardware resources will be used by the running partition.

The information used by the HMC to define these partitions and profiles is saved in a dedicated persistent area in non-volatile random access memory (NVRAM) to prevent its loss, to avoid having the user reenter this information every time the HMC is started, and to enable the sharing of this information with other HMCs that may be connected and managing the same CEC. This information used to define these partitions and profiles is saved to a dedicated persistent area in NVRAM, referred to herein as the save area. The save area is formatted in a specific way according to the current release version of the CEC firmware. Each time the release version of the CEC changes, the formatting of the save area may change.

A problem arises when an HMC that has firmware running at a particular release version tries to manage a CEC running at a more recent version. For example, a new version of firmware may be installed on the CEC, but the corresponding HMC firmware release version may not be installed on the HMC. The format of the save area in NVRAM can and does change from one release version of the CEC to another. Changes may be required because of new properties being added to partition profiles which are stored in the save area. The size of the save area may need to change to accommodate an increase in the capability of a new release of the CEC.

For example, an early version of the CEC might support only 16 partitions while a later version of the CEC may support 32. The size of the save area for the later version would have to increase to accommodate this change in the amount of information that needs to be saved. Simply increasing the size of the save area to allow for future growth would not help this situation because any modifications to the partition or profile information would make a change necessary in the format of the save area. This change would not be understood by the older version of the HMC and would make the HMC's parsing of the save area data incorrect.

Currently, since an earlier version of the HMC cannot tell what may have changed in a newer version of the save area, the older version HMC will be unable to manage the CEC. There is no forward compatibility. At this point, the only option open to the HMC administrator is to upgrade the release version of the HMC.

Therefore, a need exists for a method, system, and product for managing persistent data across multiple different releases so that an HMC using an older version release will be able to manage a CEC using an updated version.

SUMMARY OF THE INVENTION

A method, system, and computer program product are disclosed for managing an application's persistent data across multiple different release versions of the application. A format for a memory area is defined wherein the persistent data will be stored according to a first release version of the application. The format is organized to permit the application running at different release versions to access the memory area. The memory area is accessed using the application that is running at a second release version. The memory area is divided into individually accessible sections. The format includes a template file for each section for each release version.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
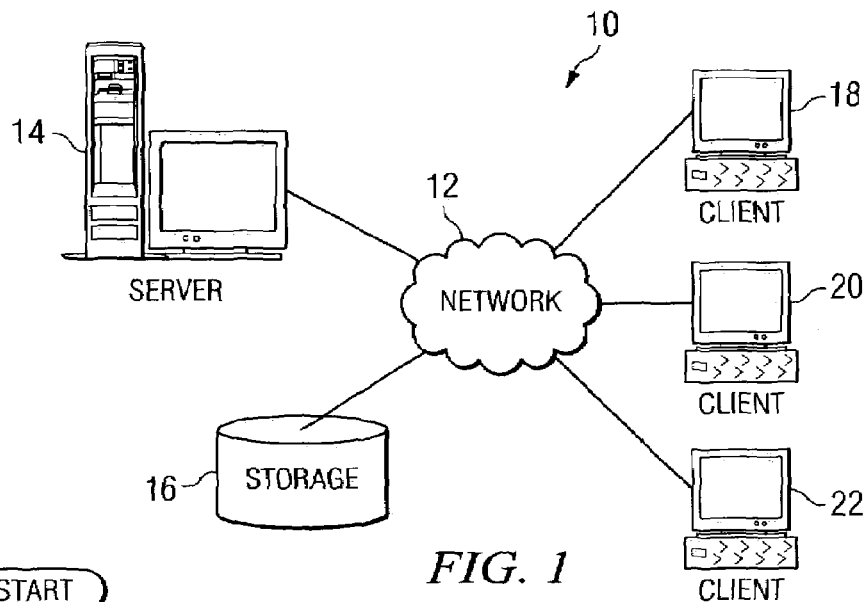
FIG. 1 is a pictorial representation which depicts a data processing system in which the present invention may be implemented in accordance with a preferred embodiment of the present invention.

A preferred embodiment of the present invention and its advantages are better understood by referring to the figures, like numerals being used for like and corresponding parts of the accompanying figures.

The present invention is a method, system, and product for managing persistent data across different releases. The persistent data is maintained within a save area within a memory device such as an NVRAM.

The present invention provides a method for organizing and parsing the save area data such that any HMC at any release version can obtain the partition and profile information that is relevant for the current release running on the HMC. A older version HMC will not access information specific to a later release, but it will be able to access information that is relevant to the HMC's release version.

The first part of the solution is to organize the data so that any future changes that need to be made are incorporated in such a way that they can be isolated and remain invisible to an older version. This includes procedures for the addition or removal of whole new sections of data and the addition of new data into an existing section or the removal of no longer needed data from an existing section.

The second part of the solution concerns the retrieval of the data from the save area. The HMC must be able to access the data that is relevant to its release and disregard other data that is specific only to other releases. In a preferred embodiment, the process of defining and parsing the save area data is accomplished using XML. However, those skilled in the art will recognize that technologies other than XML may be used to perform the same tasks.

The save area will be laid out in sections. Each section will contain specific information related to either partitions or profiles. The save area may be accessed by one section at a time. Thus, a particular section can be read or written to, rather than having to read or write the entire save area at once. Each section will be made up of data elements.

A template file will be created which will be, in a preferred embodiment, an XML document file. This XML document file will hold a template for each section of the save area for each release version of the save area. The template for a section will be specific for that release version and the elements of the template will be uniquely identifiable with that release. As new releases of the HMC firmware occur, templates that uniquely identify the save area expected by that HMC firmware release will be added to this XML document file. The HMC will use these release-specific templates to parse the save area data. Thus, if a new element is added in a release, the HMC at that release will use the appropriate template. Since an HMC running at an earlier release level only uses its own template, that older HMC release version will not be affected by the new data.

According to an important feature of the present invention, the data must be organized within the save area in such a way that sections can be individually read and parsed using the XML document file. This will require that each section have a length field to indicate the amount of data in that section. Also, if a section includes a more complex data structure, such as an array, the length of the structure must also be kept. It is necessary to keep the length of the structure as it could change from one release to another. When this length field is read from the save area, it is used to determine how much data there is actually in the save area versus how much data the HMC is expecting to parse.

Another field will be kept in the save area that will uniquely identify the sections included in this version of the save area. Sections will be numbered sequentially. For example, for a save area for release n, the section numbers might be 1, 2, 3, and 4, while for a save area for some release n+, the section numbers included in that release might be 1, 2, 3, and 5. This would indicate that in release n+, section 4 is no longer used and a new section 5 has been added. When the older version HMC begins to parse the newer version save area, the HMC will determine that section 4 is not available and not attempt to parse the save area, and it will see an unrecognized section, section 5, and will not attempt to parse that section either. Therefore, the decision to remove sections or data items from a section in a particular release must be made carefully, taking into consideration the requirements of the previous releases.

Another feature of the present invention involves reading data correctly from the save area. A template file, such as an XML document file, will be created that will contain templates that define exactly the expected layout of the save area for each release of the HMC code. The layout of a template is a series of elements. Each element represents a data item in the save area. Each element has an associated type attribute. An element may be a simple data type, for example, an integer, a short, or a byte. Simple data types have a defined size which indicates the number of bytes that need to be read to get the data item. Elements may also be complex types, such as structures containing multiple simple data items or other structures such as arrays.

There are also elements that are version-based structures. A version-based structure is defined for a specific release level. As an example, a structure v_b_struct_1 would be a version-based structure implemented specifically for a particular version. The version-based structures provide flexibility to the data retrieval method.

All complex structures ultimately are made up of simple elements. Some structures, such as arrays, also have an associated size attribute indicating the number of elements in the array. Version-based structures will also have a size attribute. Since the elements in a version-based structure may change from one release to another, this size can be used while parsing the structure to determine the length of the structure in the save area. The sections of the save area themselves are defined in the template file as version-based structures. That is, each section is associated with a particular release version and includes a section length for the section.

When the HMC connects to the CEC, the HMC will first obtain the release level of the system. The HMC will compare this level to its own. If the levels match, the HMC will use an XML parser to parse the template file, parsing the elements of the templates and using the data types to determine the length of each item. All version-based structures tagged with the current release level will be parsed. With this information, the HMC will create a table of offsets. Since the versions match, no adjustments need to be made during the parsing of the templates to account for unrecognized data in the save area. Thus, all of the offsets in the offset table will point to the appropriate data item in the save area.

If the HMC connects to a CEC and determines that the system's release level is greater than the HMC's, the HMC will need to make use of the special fields that have been placed in the save area for this situation. The data in these fields will be used during the parsing of the templates to determine the correct offsets to generate.

First the HMC will read from the save area the list of sections field. This field will always be in a known location at the beginning of the save area. Its offset will not change so that it can be read by any HMC running at any release level. If the list of sections, for example, contains 1, 2, 3, and 5, the HMC will parse its template file looking for a section 1 template. Once the offsets for section 1 have been generated by the HMC, the HMC will parse its template file looking for a section 2 template. The HMC will then generate offsets for reading section 2. Thereafter, the HMC will parse the template file looking for a section 3 template, and then a section 5 template in order to generate offsets to read each of these sections individually.

If the template located by the HMC for a section does not describe a version-based structure, it can be parsed directly.

If the template does describe a version-based structure, the HMC will search for a template for section 1 with a version tag nearest to the required release. This should be the HMC's current release level template. As noted above, the template file will contain all of the templates for all releases up to the HMC's current level. The HMC should not use one of the older template versions for parsing.

Once the appropriate template for the section is selected, the HMC will have to parse the template in combination with reading from the save area in order to generate the correct offsets. As noted above, each section will have a length field. This field will be in the same relative place in each section so the offset needed to read it from the save area can be easily calculated. The HMC will read the length, and as it parses the template the HMC will keep track of the actual length of the parsed elements. Once the HMC reaches the end of the template the HMC compares the accumulated length against the length stored in the save area. If these lengths match, the offsets generated are correct and the offset for the start of the next section is calculated as the offset of the last element in the first section plus the length of that element. If the lengths do not match, i.e. the length stored in the save area is greater than the length calculated during parsing, the offset for the start of the next section is calculated as the offset for the last element in the first section plus the length of the last element plus the difference between the stored length and the parsed length. Thus, the offset for the next section will be set so that the HMC will skip over the new data in the save area that the HMC was not expecting. Any version-based structures in the template file will be handled in a similar manner.

If the HMC finds that the save area does not contain a section it is expecting, special handling will have to be implemented. Again, if this section is critical for the HMC's management of the CEC, there should be no reason to remove it in a future release. If such is the case, however, the HMC will have to assign special values to the offsets for data items in the deleted section. This special value will indicate during the parsing of the template file that offsets need to be adjusted to account for the missing section. When the HMC tries to read and parse the save area using these offsets, it will have to check for the special value and adjust its behavior accordingly.

The most difficult scenario to handle is the situation where a single data item is removed from within a section. In this case, the length of the section stored in the save area will be greater than the length calculated during parsing of the template for that section. At this point, there is no reliable way for the HMC to determine such a deletion. This is the one case that should be treated as an error condition, where the HMC is unable to manage the CEC. This places a greater emphasis on the proper design of the contents of the save area. The inclusion of data items that are not completely necessary and the removal of data items even if they seem no longer useful should be avoided.

FIG. 1 depicts a pictorial representation of a network of data processing systems in which the present invention may be implemented. Network data processing system 10 is a network of computers in which the present invention may be implemented. Network data processing system 10 contains a network 12, which is the medium used to provide communications links between various devices and computers connected together within network data processing system 10. Network 12 may include connections, such as wire, wireless communication links, or fiber optic cables.

In the depicted example, a server 14 is connected to network 12 along with storage unit 16. In addition, clients 18, 20, and 22 also are connected to network 12. Network 12 may include permanent connections, such as wire or fiber optic cables, or temporary connections made through telephone connections. The communications network 12 also can include other public and/or private wide area networks, local area networks, wireless networks, data communication networks or connections, intranets, routers, satellite links, microwave links, cellular or telephone networks, radio links, fiber optic transmission lines, ISDN lines, T1 lines, DSL, etc. In some embodiments, a user device may be connected directly to a server 14 without departing from the scope of the present invention. Moreover, as used herein, communications include those enabled by wired or wireless technology.

Clients 18, 20, and 22 may be, for example, personal computers, portable computers, mobile or fixed user stations, workstations, network terminals or servers, cellular telephones, kiosks, dumb terminals, personal digital assistants, two-way pagers, smart phones, information appliances, or network computers. For purposes of this application, a network computer is any computer, coupled to a network, which receives a program or other application from another computer coupled to the network.

In the depicted example, server 14 provides data, such as boot files, operating system images, and applications to clients 18–22. Clients 18, 20, and 22 are clients to server 14. Network data processing system 10 may include additional servers, clients, and other devices not shown. In the depicted example, network data processing system 10 is the Internet with network 12 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 10 also may be implemented as a number of different types of networks, such as for example, an intranet, a local area network (LAN), or a wide area network (WAN). FIG. 1 is intended as an example, and not as an architectural limitation for the present invention.

Figure 2:
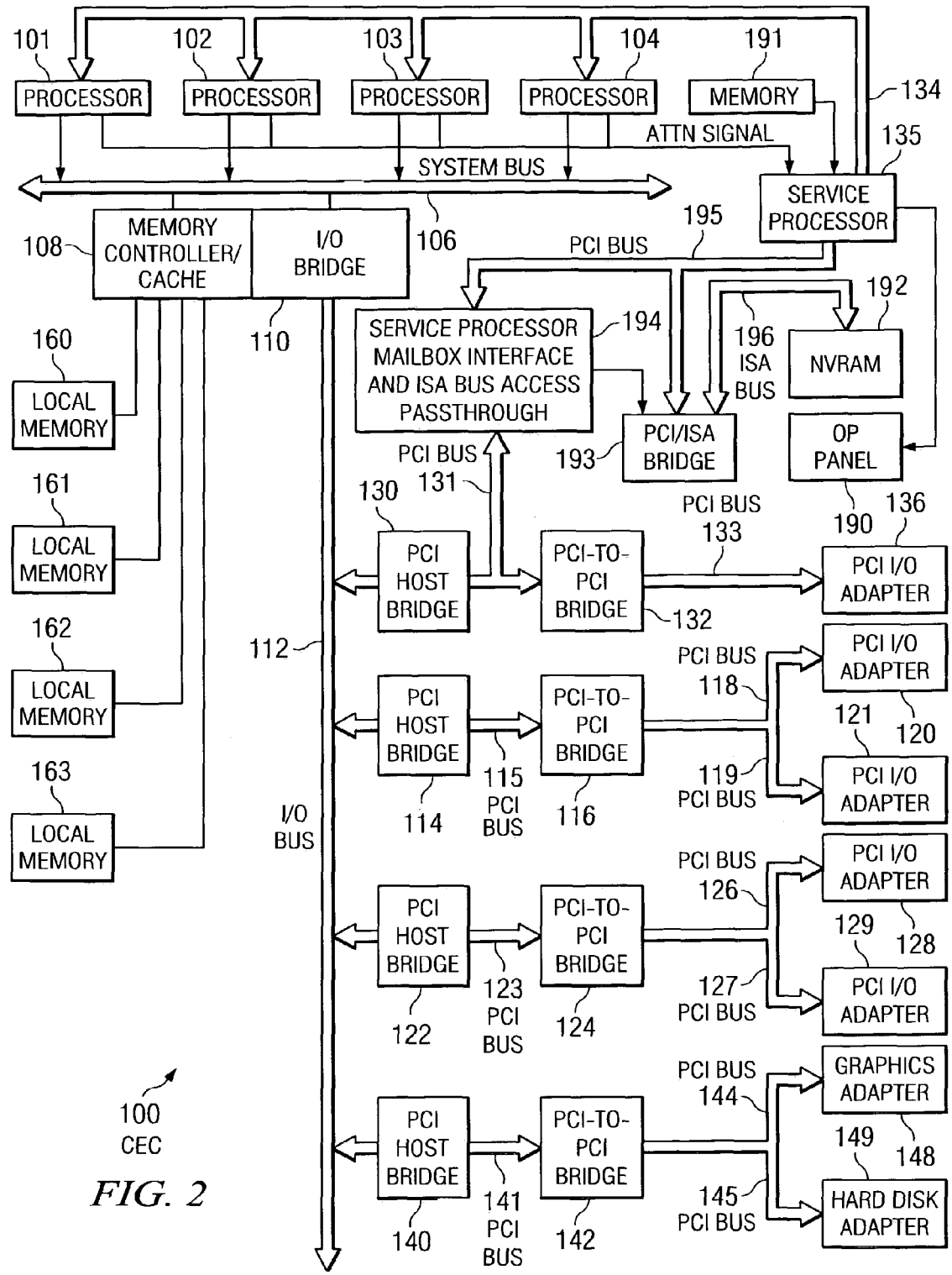
FIG. 2 is a more detailed block diagram of a central electronics complex (CEC) in accordance with the present invention.

FIG. 2 is a more detailed block diagram of a central electronic complex (CEC) within a data processing system in which the present invention may be implemented. CEC 100 may include a plurality of processors 101, 102, 103, and 104 connected to system bus 106. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

CEC 100 is a logically partitioned data processing system. Thus, CEC 100 may have multiple heterogeneous operating systems (or multiple instances of a single operating system) running simultaneously. Each of these multiple operating systems may have any number of software programs executing within it. CEC 100 is logically partitioned such that different I/O adapters 120–121, 128–129, 136, and 148–149 may be assigned to different logical partitions.

Thus, for example, suppose CEC 100 is divided into three logical partitions, P1, P2, and P3. Each of I/O adapters 120–121, 128–129, 136, and 148–149, each of processors 101–104, and each of local memories 160–163 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within CEC 100 is assigned to a different logical partition. Thus, each operating system executing within CEC 100 may access only those I/O units that are within its logical partition.

Peripheral component interconnect (PCI) Host bridge 114 connected to I/O bus 112 provides an interface to PCI local bus 115. A number of Input/Output adapters 120–121 may be connected to PCI bus 115. Typical PCI bus implementations will support between four and eight I/O adapters (i.e. expansion slots for add-in connectors). Each I/O Adapter 120–121 provides an interface between CEC 100 and input/output devices such as, for example, other network computers.

An additional PCI host bridge 122 provides an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, CEC 100 allows connections to multiple network computers.

A memory mapped graphics adapter 148 may be connected to I/O bus 112 through PCI Host Bridge 140 and PCI—PCI bridge 142 via PCI buses 144 and 145 as depicted.

A PCI host bridge 130 provides an interface for a PCI bus 131 to connect to I/O bus 112. PCI bus 131 connects PCI host bridge 130 to the service processor mailbox interface and ISA bus access pass-through logic 194 and PCI—PCI bridge 132. The ISA bus access pass-through logic 194 forwards PCI accesses destined to the PCI/ISA bridge 193. The NVRAM storage is connected to the ISA bus 196. The Service processor 135 is coupled to the service processor mailbox interface 194 through its local PCI bus 195. Service processor 135 is also connected to processors 101–104 via a plurality of JTAG/I²C buses 134. JTAG/I²C buses 134 are a combination of JTAG/scan busses (see IEEE 1149.1) and Phillips I²C busses. However, alternatively, JTAG/I²C buses 134 may be replaced by only Phillips I²C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190.

When CEC 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of CEC 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BTSTs, BATs, and memory tests, then CEC 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the CEC 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in CEC 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for reconfiguration during the current running session and future Initial Program Loads (IPLs). IPLs are also sometimes referred to as a "boot" or "bootstrap".

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

Figure 3:
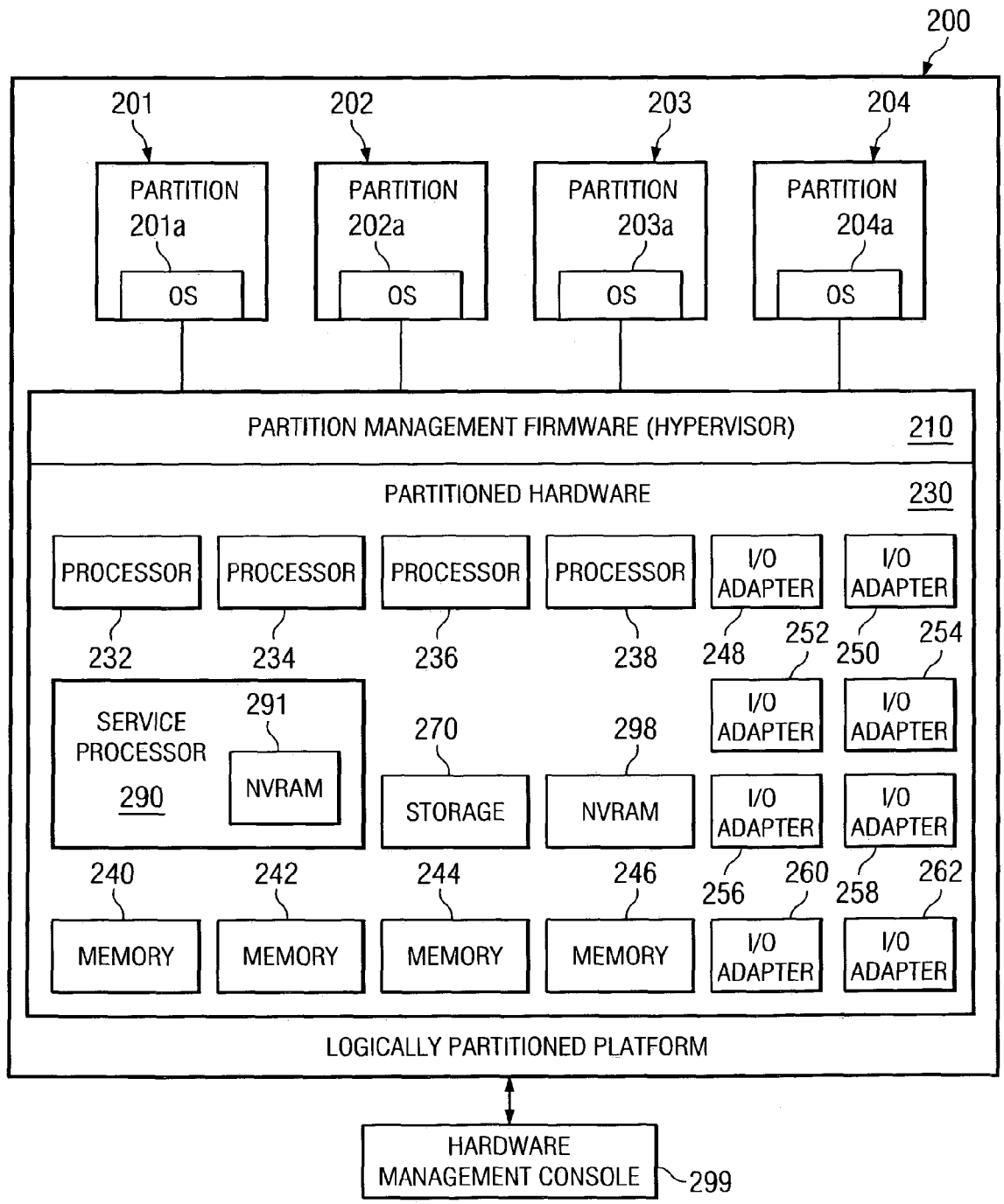
FIG. 3 is a block diagram of an exemplary logically partitioned platform in which the present invention may be implemented.

FIG. 3 is a block diagram of an exemplary logically partitioned platform in which the present invention may be implemented. Logically partitioned platform 200 includes partitioned hardware 230, partition management firmware, also called a hypervisor 210, and partitions 201–204. Operating systems 201a–204a exist within partitions 201–204. Operating systems 201a–204a may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NVRAM storage 298, and I/O adapters 248–262 may be assigned to one of multiple partitions 201–204.

Partitioned hardware 230 also includes service processor 290. A non-volatile memory device 291, such as an NVRAM device, is included within service processor 290. The partition tables and firmware images described herein, as well as other information, are stored within a save area within NVRAM 291.

Partition management firmware (hypervisor) 210 performs a number of functions and services for partitions 201–204 to create and enforce the partitioning of logically partitioned platform 200. Hypervisor 210 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 210 allows the simultaneous execution of independent OS images 201a–204a by virtualizing all the hardware resources of logically partitioned platform 200. Hypervisor 210 may attach I/O devices through I/O adapters 248–262 to single virtual machines in an exclusive mode for use by one of OS images 201a–204a.

A hardware management console (HMC) 299 may be coupled to CEC 100 which includes logically partitioned platform 200. HMC 299 is a separate computer system that is coupled to service processor 290 and may be used by a user to control various functions of CEC 100 through service processor 290. HMC 299 includes a graphical user interface (GUI) which may be used by a user to select a partition to be rebooted. Further, a listing of different firmware images that are stored within the save area of NVRAM 291 may be presented to the user utilizing the graphical user interface of HMC 299. The user may then select one of the listed firmware images to use to boot the selected partition as described below.

When a user selects a partition, HMC 299 transmits a request to service processor 290 to have service processor 290 update the partition table associated with the selected partition. Service processor 290 updates the partition table by setting an indicator within the table to indicate that the associated partition needs to be rebooted. In addition, HMC 299 transmits an identifier to service processor 290 which identifies the particular firmware image selected by the user. Service processor 290 then stores this identifier within the partition table associated with the selected partition. As described in more detail below, hypervisor 210 routinely checks each partition table to determine a current state of the indicator stored in each table. When hypervisor 210 finds an indicator that indicates a partition needs to be rebooted, hypervisor 210 copies the firmware image identified within that partition table to the logical memory of the partition associated with the partition table. That firmware image is then executed within the partition causing only that partition to be rebooted. Other partitions are unaffected by this process.

Figure 4:
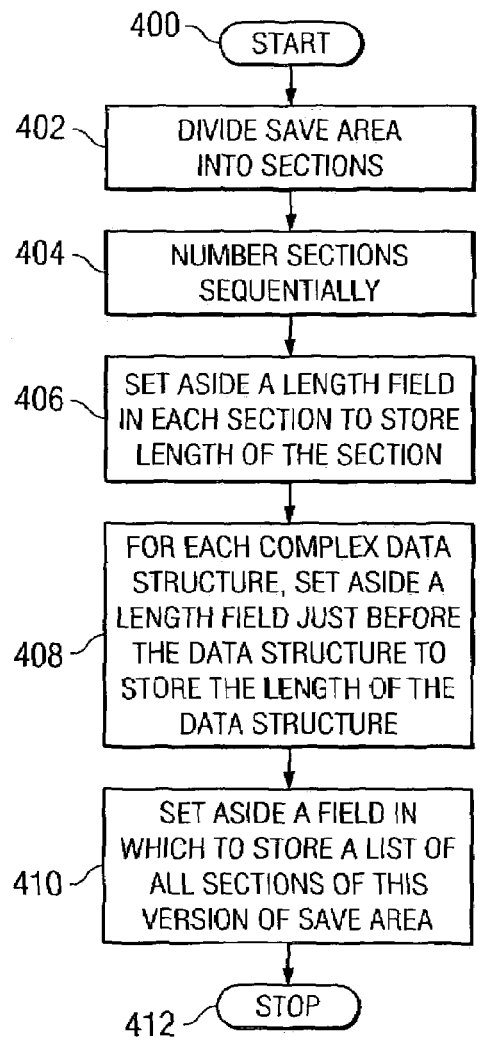
FIG. 4 illustrates a high level flow chart which depicts organizing a layout of a memory save area in accordance with the present invention.

FIG. 4 illustrates a high level flow chart which depicts organizing a layout of a memory save area in accordance with the present invention. The process starts as depicted by block 400 and thereafter passes to block 402 which illustrates dividing a memory save area into sections. Next, block 404 depicts numbering the sections sequentially. Each section will then be able to be identified by its section number. Thereafter, block 406 illustrates setting aside a length field in each section of the save area to store the total length of the section. This length field is located at the same place in each section so that it may be easily found. For example, for each section, this length field may be the first field of the section.

The process then passes to block 408 which depicts setting aside a length field in the save area for each complex data structure. A complex data structure is a version-based structure. This field is used to store the length of the data structure that follows the field. Block 410, then, illustrates setting aside a field in which to store a list of all sections for this particular version of the memory save area. For example, one version may include sections 1, 2, 3, and 4. A later, more recent version, may include sections 1, 2, 3, and 5. Therefore, the field is used to store the list that identifies sections 1, 2, 3, and 5 as being the current sections of the save area. The process then terminates as depicted by block 412.

Figure 5:
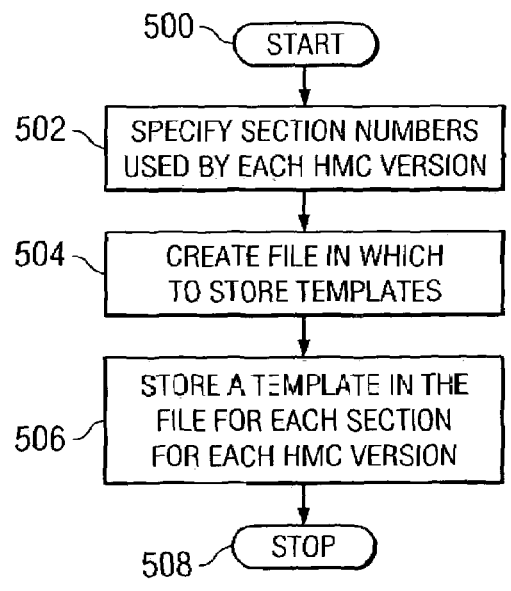
FIG. 5 depicts a high level flow chart which illustrates generating a template file including templates for each section of a memory save area in accordance with the present invention.

FIG. 5 depicts a high level flow chart which illustrates generating a template file including templates for each section of a memory save area in accordance with the present invention. The process starts as depicted by block 500 and thereafter passes to block 502 which illustrates specifying the section numbers used by each version of the HMC code. Next, block 504 depicts creating a file in which to store templates. Block 506, then, illustrates storing a template in the file for each section of the save area. A template is stored in the file for each section for each version of the HMC code. The process then terminates as depicted by block 508.

Figure 6:
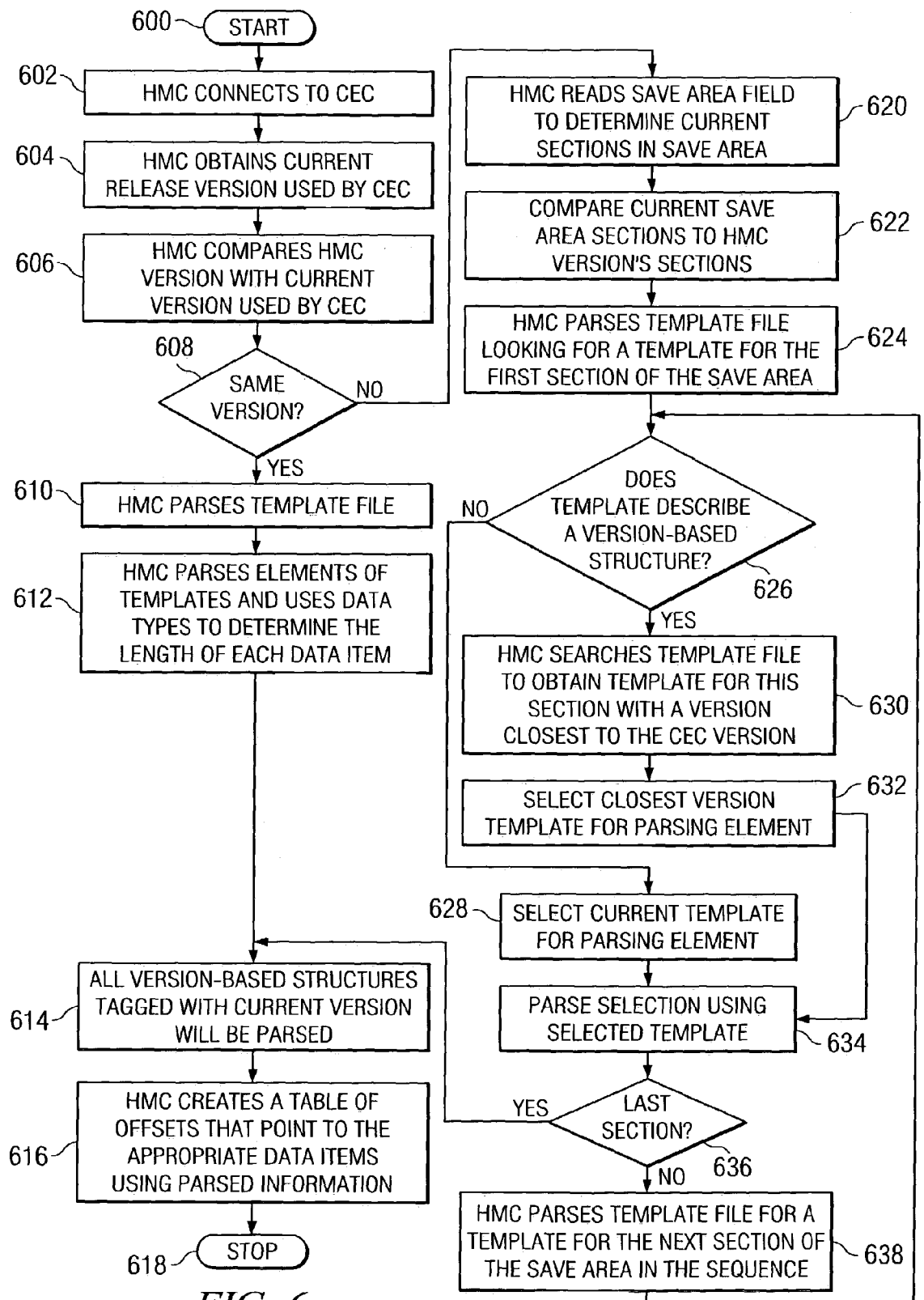
FIG. 6 illustrates a high level flow chart which depicts utilizing a template file to generate offsets to read a memory save area in accordance with the present invention.

FIG. 6 illustrates a high level flow chart which depicts utilizing a template file to generate offsets to read a memory save area in accordance with the present invention. The process starts as depicted by block 600 and thereafter passes to block 602 which illustrates the HMC connecting to the HMC. Next, block 604 depicts the HMC determining the current release version used by the CEC by querying the data processing system. Thereafter, block 606 illustrates the HMC comparing the HMC version with the current version used by the CEC.

The process then passes to block 608 which depicts a determination of whether or not they are the same versions. If a determination is made that the HMC and CEC are using the same version, the process passes to block 610 which illustrates the HMC parsing the template file that includes templates for each section. Block 612, then, depicts the HMC parsing the elements of the templates and using the data types of each element to determine the length of each data item. Next, block 614 illustrates all version-based structures that are tagged with the current HMC and CEC version being parsed. Thereafter, block 616 depicts the HMC creating a table of offsets that point to the appropriate data items using the parsed information. The process then terminates as illustrated by block 618.

Referring again to block 608, if a determination is made that the HMC and CEC are using different versions, the process passes to block 620 which depicts the HMC reading the save area field to determine the current sections that are included in the save area. Next, block 622 illustrates comparing the current save area sections to the sections expected to be found in the save area by the HMC version. Block 624, then, depicts the HMC parsing the template file looking for a template for the first section of the save area.

The process then passes to block 626 which illustrates a determination of whether or not the template describes a version-based structure. If a determination is made that the located template does not describe a version-based structure, the process passes to block 628 which depicts selecting the current template for parsing the element. Next, block 634 illustrates parsing the section using the selected template.

Block 636, then, depicts a determination of whether or not this is the last section to be parsed. If a determination is made that this is the last section, the process passes to block 614. Referring again to block 636, if a determination is made that this not the last section, the process passes to block 638 which illustrates the HMC parsing the template file for a template for the next section in the sequence. The process then passes back to block 626.

Referring again to block 626, if a determination is made that the template does describe a version-based structure, the process passes to block 630 which depicts the HMC searching the template file to obtain the template for this section having a version that is closest to the CEC's version. Next, block 632 illustrates selecting for parsing the structure the template having the closest version. The process then passes to block 634.

Figure 7:
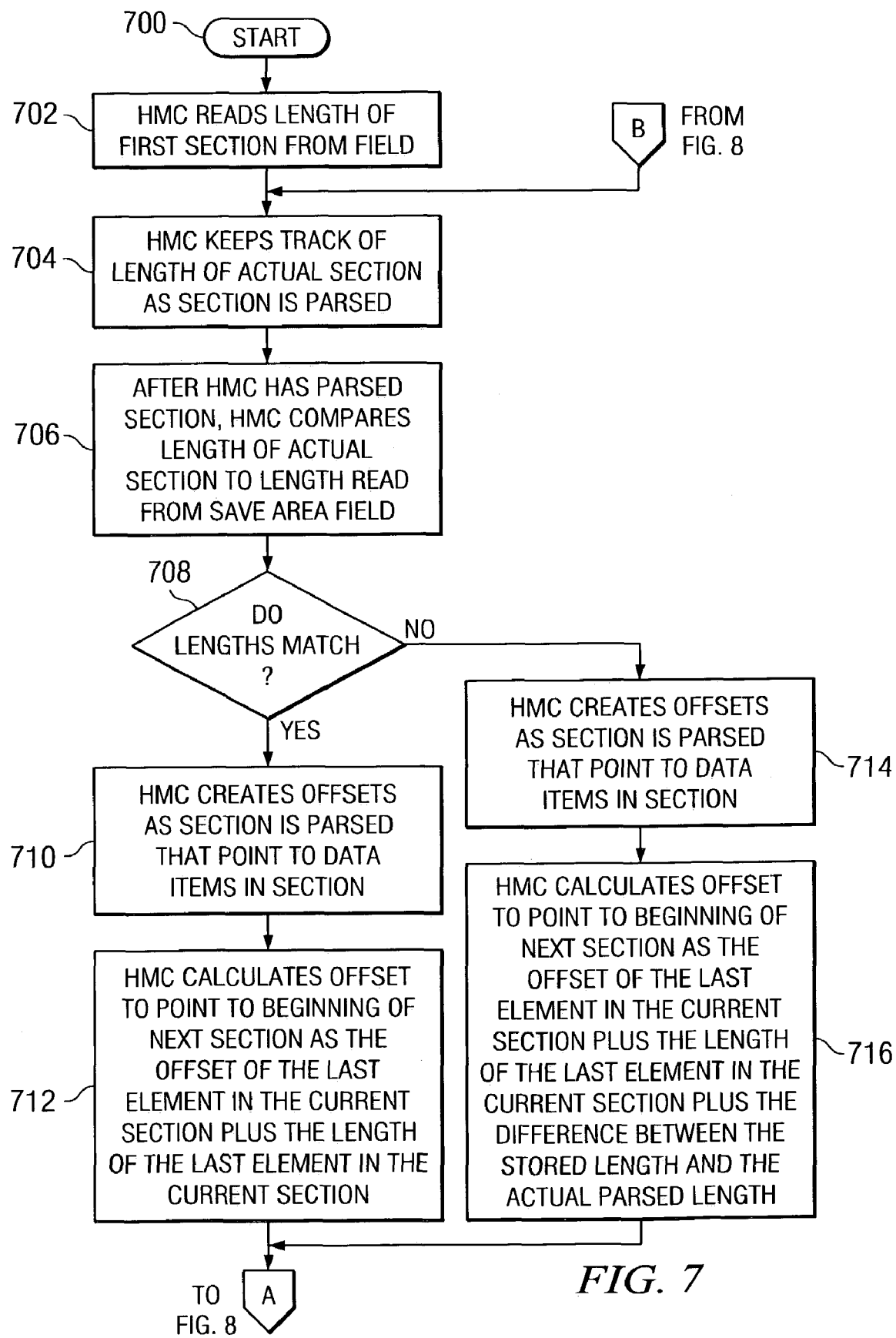
FIGS. 7–8 together depict a high level flow chart which illustrates reading a memory save area utilizing generated offsets in accordance with the present invention.
Figure 8:
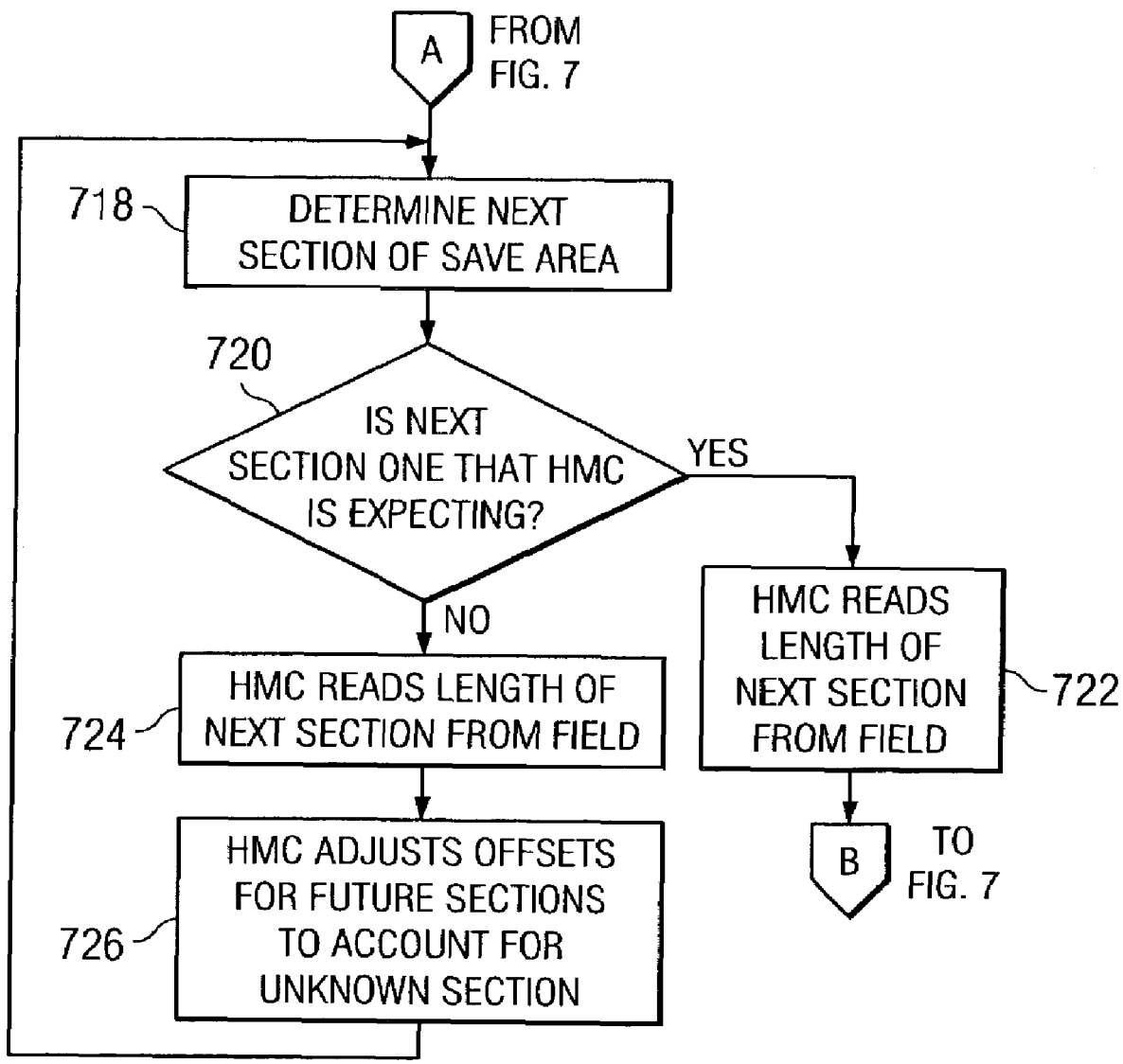

FIGS. 7–8 together depict a high level flow chart which illustrates reading a memory save area utilizing generated offsets in accordance with the present invention. The process starts as depicted by block 700 and thereafter passes to block 702 which illustrates the HMC reading the length of the first section from the field. Next, block 704 depicts the HMC keeping track of the length of the actual section as the section is parsed. Thereafter, block 706 illustrates the HMC comparing the length of the actual parsed section to the expected length obtained by reading the length field.

Block 708, then, depicts a determination of whether or not the actual and expected lengths are the same. If a determination is made that the actual and expected lengths are the same, the process passes to block 710 which illustrates the HMC creating offsets as the section is parsed. These offsets point to the individual data items in the section. Next, block 712 depicts the HMC calculating an offset to point to the beginning of the next section. The offset to the beginning of the next section is equal to the offset of the last element in the current section plus the length of the last element in the section. The process then passes to block 718 as illustrated through connector A.

Referring again to block 708, if a determination is made that the lengths do not match, the process passes to block 714 which illustrates which illustrates the HMC creating offsets as the section is parsed. These offsets point to the individual data items in the section. Next, block 716 depicts the HMC calculating an offset to point to the beginning of the next section. The offset to the beginning of the next section is equal to the offset of the last element in the current section plus the length of the last element in the section plus the difference between the stored, also referred to as the expected length, and the actual parsed length. The process then passes to block 718 as illustrated through connector A.

Block 718 depicts determining the next section of the save area. Thereafter, block 720 illustrates a determination of whether or not the next section is the section that the HMC is expecting. If a determination is made that the next section is the section that the HMC is expecting, the process passes to block 722 which depicts the HMC reading the length of the next section from that section's length field. The process then passes back to block 704 as illustrated through connector B.

Referring again to block 720, if a determination is made that the next section is not one that the HMC is expecting, the process passes to block 724 which depicts the HMC reading the length of the next section from that section's length field. Block 726, then, illustrates the HMC adjusting offsets for future sections to account for the unknown section. The process then passes back to block 718.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing an application's persistent data across multiple different release versions of said application, said method comprising the steps of:
    defining a format for a memory area wherein said persistent data will be stored according to a first release version of said application;
    organizing said format to permit said application running at different release versions to access said memory area; and
    accessing said memory area by said application that is running at a second release version utilizing said format.

2. The method according to claim 1, further comprising the steps of:
    said step of defining a format further comprising the step of logically dividing said memory area into individually accessible sections; and
    maintaining a template of a layout for each one of said sections for each one of said release versions.

3. The method according to claim 1, further comprising the steps of:
    storing first data in said memory area for said first release version and storing second data in said memory area for said second release version; and
    retrieving only said second data from said memory area using said application that is running at a second release version and disregarding said first data.

4. The method according to claim 1, further comprising the steps of:
    storing in said memory area data that is specific to each one of said release versions;
    retrieving from said memory area, by said application that is running at said second release version, data that is specific to only said second release version; and
    disregarding, by said application that is running at said second release version, data that is specific to ones of said release versions other than said second release version.

5. A method in a data processing system for managing an application's persistent data, stored within a memory area, across multiple different release versions of said application, said method comprising the steps of:
    logically dividing said memory area into individually accessible sections;
    defining a layout for each one of said sections for storing data for each one of said release versions;
    creating a template of said layout for each one of said sections for each one of said release versions; and
    accessing a current release version of said memory area by said application that is running at a particular release version using a template of said layout for each section created for said particular release version, said current release version being different from said particular release version.

6. The method according to claim 5, further comprising the steps of:
    numbering each one of said sections sequentially;
    determining which ones of said sections are included in each one of said release versions; and
    determining which ones of said sections are included in said current release version of said memory area.

7. The method according to claim 5, further comprising the steps of:

setting aside a length field in each one of said sections in which to store a length of said section;

setting aside a field in said memory area in which to store an identification of all sections included in said memory area for each one of said release versions; and setting aside a length field in each one of said sections in which to store a length for each variable length complex data structure included in said section.

8. The method according to claim 5, further comprising the steps of:

for each one of said sections, generating an offset into each one of said sections of said memory area utilizing said template of said layout for each section created for said particular release version, said offsets being used to determine where each one of said sections is located within said memory area.

9. The method according to claim 8, further comprising the steps of:

adjusting said offsets when said current release version of said memory area includes a section that is not expected by said application that is running at said particular release version.

10. The method according to claim 8, further comprising the steps of:

parsing each one of said sections of said memory area by said application;

determining during said parsing whether each one of said sections of said memory area is an expected length; and in response to a determination that one of said sections is not said expected length, adjusting an offset for one of said sections and adjusting an offset for all of said sections that are located after said one of said sections.

11. A data processing system for managing an application's persistent data across multiple different release versions of said application, said system comprising:

a format for a memory area wherein said persistent data will be stored according to a first release version of said application;

said format being organized to permit said application running at different release versions to access said memory area; and said application that is running at a second release version accessing said memory area utilizing said format.

12. The system according to claim 11, further comprising:

said memory area being logically divided into individually accessible sections; and a template of a layout for each one of said sections for each one of said release versions.

13. The system according to claim 11, further comprising:

first data being stored in said memory area for said first release version and second data being stored in said memory area for said second release version; and said application that is running at a second release version retrieving only said second data from said memory area and disregarding said first data.

14. The system according to claim 11, further comprising:

data being stored in said memory area that is specific to each one of said release versions;

said application that is running at said second release version retrieving from said memory area data that is specific to only said second release version; and said application that is running at said second release version disregarding data that is specific to ones of said release versions other than said second release version.

15. A data processing system for managing an application's persistent data, stored within a memory area, across multiple different release versions of said application, said system comprising:

said memory area being logically divided into individually accessible sections;

a layout for each one of said sections for storing data for each one of said release versions;

a template of said layout for each one of said sections for each one of said release versions; and said application that is running at a particular release version accessing a current release version of said memory area using a template of said layout for each section created for said particular release version, said current release version being different from said particular release version.

16. The system according to claim 15, further comprising:

each one of said sections being numbered sequentially;

said system including a CPU executing code for determining which ones of said sections are included in each one of said release versions; and said CPU executing code for determining which ones of said sections are included in said current release version of said memory area.

17. The system according to claim 15, further comprising:

a length field in each one of said sections for storing a length of said section;

a field in said memory area for storing an identification of all sections included in said memory area for each one of said release versions; and a length field in each one of said sections for storing a length of each variable length complex data structure included in said section.

18. The system according to claim 15, further comprising:

for each one of said sections, said system including a CPU executing code for generating an offset into each one of said sections of said memory area utilizing said template of said layout for each section created for said particular release version, said offsets being used to determine where each one of said sections is located within said memory area.

19. The system according to claim 18, further comprising:

said CPU executing code for adjusting said offsets when said current release version of said memory area includes a section that is not expected by said application that is running at said particular release version.

20. The system according to claim 18, further comprising:

said system including a CPU executing code for parsing each one of said sections of said memory area by said application;

said system including a CPU executing code for determining during said parsing whether each one of said sections of said memory area is an expected length; and in response to a determination that one of said sections is not said expected length, said system including a CPU executing code for adjusting an offset for one of said sections and adjusting an offset for all of said sections that are located after said one of said sections.

21. A computer program product in a data processing system for managing an application's persistent data, stored within a memory area, across multiple different release versions of said application, said product comprising:

instruction means for logically dividing said memory area into individually accessible sections;

instruction means for defining a layout for each one of said sections for storing data for each one of said release versions;

instruction means for creating a template of said layout for each one of said sections for each one of said release versions; and instruction means for accessing a current release version of said memory area by said application that is running at a particular release version using a template of said layout for each section created for said particular release version, said current release version being different from said particular release version.

22. The product according to claim 21, further comprising:

instruction means for numbering each one of said sections sequentially;

instruction means for determining which ones of said sections are included in each one of said release versions; and instruction means for determining which ones of said sections are included in said current release version of said memory area.

23. The product according to claim 21, further comprising:

instruction means for setting aside a length field in each one of said sections in which to store a length of said section;

instruction means for setting aside a field in said memory area in which to store an identification of all sections included in said memory area for each one of said release versions; and instruction means for setting aside a length field in each one of said sections in which to store a length for each variable length complex data structure included in said section.

24. The product according to claim 21, further comprising:

for each one of said sections, instruction means for generating an offset into each one of said sections of said memory area utilizing said template of said layout for each section created for said particular release version, said offsets being used to determine where each one of said sections is located within said memory area.

25. The product according to claim 24, further comprising:

instruction means for adjusting said offsets when said current release version of said memory area includes a section that is not expected by said application that is running at said particular release version.

26. The product according to claim 24, further comprising:

instruction means for parsing each one of said sections of said memory area by said application;

instruction means for determining during said parsing whether each one of said sections of said memory area is an expected length; and in response to a determination that one of said sections is not said expected length, instruction means for adjusting an offset for one of said sections and adjusting an offset for all of said sections that are located after said one of said sections.

* * * * *